United States Patent [19]
Au

[11] Patent Number: 5,643,849
[45] Date of Patent: Jul. 1, 1997

[54] CATALYSTS AND IMPROVED PROCESS FOR PREPARING SALTS OF ALDONIC ACID

[75] Inventor: Van Au, Peekskill, N.Y.

[73] Assignee: Lever Brothers Company, Division of Conopco, Inc., New York, N.Y.

[21] Appl. No.: 279,578

[22] Filed: Jul. 25, 1994

[51] Int. Cl.$^6$ .............. B01J 23/44; B01J 37/00; B01J 23/16

[52] U.S. Cl. .............. 502/185; 502/101; 502/107; 502/113; 502/201; 502/326; 502/353; 502/416

[58] Field of Search .............. 536/123.13; 502/185, 502/201, 101, 107, 113, 326, 353, 416

[56] References Cited

U.S. PATENT DOCUMENTS

| | | | |
|---|---|---|---|
| 2,857,337 | 10/1958 | Hamilton et al. | 502/326 |
| 3,458,308 | 7/1969 | Muller | 502/323 |
| 3,666,813 | 5/1972 | Hindin et al. | 260/580 |
| 3,736,266 | 5/1973 | Schrage | 502/185 |
| 3,804,779 | 4/1974 | Kent et al. | 502/185 |
| 3,878,260 | 4/1975 | Kunugi et al. | 260/680 E |
| 3,922,300 | 11/1975 | Onoda et al. | 260/497 |
| 4,093,559 | 6/1978 | Fernholz et al. | 502/185 |
| 4,125,565 | 11/1978 | Antos | 502/326 |
| 4,791,224 | 12/1988 | Sumner et al. | 562/421 |

FOREIGN PATENT DOCUMENTS

| | | |
|---|---|---|
| 142725 | 5/1985 | European Pat. Off. . |
| 232202 | 8/1987 | European Pat. Off. ........ C07H 7/027 |
| 62-269748 | 6/1987 | Japan . |

OTHER PUBLICATIONS

Hendriks et al., Carbohydrate Research 204:121–129 Feb. 1990.

*Primary Examiner*—Glenn A. Caldarola
*Assistant Examiner*—Patricia L. Hailey
*Attorney, Agent, or Firm*—Ronald A. Koatz

[57] ABSTRACT

The present invention relates to novel palladium/bismuth/carbon catalysts which increase selectivity and activity and lower color (i.e., provide greater purity of reaction products when the catalyst is used in the oxidation reaction of an aldose to a salt of aldonic acid).

In one embodiment, the invention is concerned with a method of preparing the catalyst. In another embodiment, the invention is concerned with use of the novel catalyst to obtain superior yields (e.g., 97% and greater). In yet another embodiment of the invention, stability of catalyst (i.e., activity over time) is enhanced when using aldehyde during the oxidation of aldose to salt of aldonic acid.

7 Claims, No Drawings

CATALYSTS AND IMPROVED PROCESS FOR PREPARING SALTS OF ALDONIC ACID

BACKGROUND OF THE INVENTION

1. Field of the Invention

The present invention relates to improved catalysts and to improved process for preparing salts of aldonic acid. In one aspect of the invention, the invention relates to a process for making catalysts used in the preparation of those salts which catalyst results in high selectivity, high rate of oxidation and low colored product when aldose is oxidized to form the salt of aldonic acid. In a second aspect of the invention, the invention relates to adding small amounts of aldehyde during the oxidation of the aldose to the salt in order to improve the rate of oxidation of the catalyst and prevent its deactivation (i.e., increasing catalyst stability).

2. Background Discussion

Salts of aldonic acids (e.g., sodium lactobionate) are the precursor in the preparation of aldonolactone which are, in turn, starting materials used in the preparation of N-alkyl aldonamide surfactants (e.g., lactobionamides). Aldobionamides such as lactobionamides are nonionic surfactants which can be used in a variety of personal products and/or detergent products such as described, for example, in U.S. Ser. No. 981,737 to Au et al., hereby incorporated by reference into the subject application.

Supported noble metal catalysts such as Pd/C are not currently used commercially for the oxidation of lactose with oxygen due to poor performance of the catalyst (activity, selectivity and stability).

Salts of aldonic acid have been prepared from aldoses using palladium/bismuth/carbon catalysts.

EP 232,202, for example, describes the preparation of Pd/Bi/C catalyst (Pd:Bi of 6:2) made by impregnation of an aqueous slurry of Pd/C with bismuth subnitrate, dissolved in concentrated hydrochloric acid, followed by treatment of aqueous NaOH and reduction with formaldehyde. This catalyst was reported to give 97.5% conversion in the oxidation of maltose to sodium maltobionate. By contrast, using a catalyst prepared by the method of the invention, applicants have achieved a 99.7% conversion of lactose to sodium lactobionate having less color impurities. In addition, the present method eliminated the use of concentrated acid and base and costly bismuth subnitrate in the preparation of the catalyst.

European Patent EP 142,725 described the preparation of Bi/Pd/C catalyst made by impregnation of active carbon with bismuth hydroxide nitrate in concentrated HCl and Palladium chloride followed by neutralization with NaOH and reduction with formaldehyde. Both Pd/Bi/C and Bi/Pd/C catalysts described here show higher activity and selectivity in comparison with the unprompted Pd/C catalyst.

Henrickus E. J. "Carbohydrate Research", 204: 121–129 (1990) described the in situ bismuth promotion of Palladium on carbon catalyst. The author claimed this in situ promoted Pd/C gave 100% selectivity with 95% conversion in the oxidation of lactose to Na lactobionate.

However, all the Pd/Bi/C catalysts described above either show a lack of reactivity, selectivity or stability. Further, each involved using concentrate acids and bases in the preparation of the catalyst.

Accordingly, there is a need in the art to provide catalysts yielding even higher degree of selectivity (i.e., yield of product) in the conversion of aldose to salts of aldonic acid.

Further, there is a need in the art to provide catalyst yielding better rates of oxidation.

Finally, there is a need in the art for a method for preventing deactivation of the catalyst.

BRIEF DESCRIPTION OF THE INVENTION

In one aspect of the invention, the invention relates to an improved Pd/Bi/C catalyst made in a specific way. The improved catalyst made according to this aspect of the invention provides increased selectivity, better activity (i.e., higher rate of oxidation) and low colored product when the catalyst is used to convert aldose to salts of aldonic acid (i.e., in the second aspect of the invention). More specifically, this first aspect of the invention is directed to an improved method of preparing a Pd/Bi/C catalyst having a molar ratio of Pd:Bi of 6:1 to 6:2, wherein the palladium and bismuth are suspended on carbon, which method comprises suspending Pd/C (5.0%), and $Bi(NO_3)_3$ in water at 20°–80° C. followed by treating the catalyst with an amount of formaldehyde as defined below.

A second embodiment of the invention is concerned with the oxidation reaction of aldose to salt of aldonic acid using the catalyst prepared by the first embodiment of the invention and using air or $O_2$ as oxidant. By reacting the aldose (in water) at 40°–70° C. and at pH of 8.0 to 9.0 with 0.01 to 0.1% (by wt. aldose) aldehyde, the stability of the catalyst (i.e., activity over time) is enhanced.

DETAILED DESCRIPTION OF THE INVENTION

In one embodiment the present invention relates to improved catalysts and improved methods of making these catalysts, wherein the catalysts provide increased selectivity (yield) and increased activity (rate of oxidation) when used in the conversion of aldose to salts of aldonic acid. This is important because aldonic acid salts are used for preparing aldonolactone which are, in turn, used in the preparation of N-alkyl aldonamides such as, for example, lactobionamides.

In a second embodiment of the invention, when the catalyst is treated with small amounts of aldehyde, during the oxidation of aldose to the salt of aldonic acid, this results in improved catalyst stability (i.e., catalyst's activity over time).

As noted above, in the first embodiment of the invention, the invention relates to a method of making catalysts, specifically a Palladium/Bismuth/Carbon catalyst (i.e., palladium and bismuth on a carbon support) and to the improved catalysts created by this process.

More specifically, this aspect of the invention relates to an improved method for preparing a Pd/Bi/C catalyst having a molar ratio of Pd to Bi of 6:1 to 6:2.

The method of preparing the catalyst comprises suspending 1–10% by wt. Palladium, which is on a carbon support (90–99% by wt. carbon) and 0.1–10% by wt. $Bi(NO_3)_3$ (it should be understood that other sources of bismuth may also be used although this is preferred because of its low cost) in water at 20°–80° C., preferably 30°14 70° C., most preferably 40°–60° C. for 2 to 8, preferably 4 to 6 hours (preferably under agitation), followed by treating the catalyst with 5 to 15% (by weight of the catalyst support on carbon) of an aldehyde, preferably formaldehyde, at 40°–100°, preferably 50°–80° C. for about 4 to 10 hours.

Using the process described above, improved catalysts are obtained which gave high selectivity and low colored product of the aldonic acid salt. By low colored is meant that the product is lighter, i.e., almost white.

In a second embodiment of the invention, an aldose is oxidized to a salt of aldonic acid using an improved catalyst prepared by the first aspect of the invention. According to this embodiment, 0.01 to 1.0%, preferably 0.05 to 0.1% of an aldehyde, preferably formaldehyde, is added during the process and this has been found to enhance the rate of oxidation and improve catalyst stability.

More specifically, the oxidation of aldose is carried out in water at 40°–70° C., preferably 50°–60° C. at a pH range of from 8.0 to 9.0, preferably 8.3–8.6 (pH is adjusted with 5 to 30%, aqueous NaOH). The aldose concentration in water is from 20 to 50% by wt., preferably 25–35% by wt. aldose (e.g., lactose) is reacted with a catalyst prepared by the first embodiment of the invention in an amount 10 to 50% by wt. lactose, preferably 20–30% by wt. lactose and with aldehyde using air or $O_2$ as oxidant under temperature and pH conditions described above and further utilizing the catalyst prepared according to the first embodiment of the invention. The catalyst was added to a solution of lactose under nitrogen atmosphere. The reaction was started by removal of the nitrogen followed by introducing oxygen into the reactor.

While the aldehyde is added to the oxidation reaction to enhance the stability of the catalyst, it should be understood that the oxidation reaction may be carried out even if no aldehyde is used. That is, the reaction may be an oxidation of aldose to salt of aldonic acid using the catalyst as prepared by the first embodiment of the invention, with (preferred) or without addition of aldehyde to the reaction.

Any aldose can be used as a starting reactant with the catalyst. Aldoses are monosaccharide, disaccharide or polysaccharide containing an aldehyde group (i.e., glucose, lactose, maltose etc.). The resulting product is an alkali metal aldonic acid corresponding to the starting aldose reactant.

For example, using the process above, lactose is converted to a salt of lactobionic acid and the selectivity of the reaction is greater than 99%.

All percentages referred to in the specification and claims are intended to be percentages of weight, unless states otherwise.

The following examples are intended to further illustrate the invention. The examples are for illustrative purposes only and are not intended to limit the invention in any way.

EXAMPLE 1

General method for the preparation of Palladium-bismuth supported on carbon catalyst Pd/C (5%), 100 g was suspended in $H_2O$ (750 ml) at 50° C. $Bi(NO_3)_3$ was added. The mixture was stirred at 50° C. for four hours. 37% formaldehyde (20 ml) was added, followed by heating the mixture to 80° C. under $N_2$ for six hours. The mixture was filtered and washed with water to obtain a catalyst Pd/Bi/C.

EXAMPLE 2

Preparation of Palladium-bismuth supported on carbon catalyst with molar ratio of Pd:Bi of 6:1

Pd/C (5%), 100 g was suspended in $H_2O$ (750 ml) at 50° C. $Bi(NO_3)_3$ was added. The mixture was stirred at 50° C. for four hours. 37% formaldehyde (20 ml) was added, followed by heating the mixture to 80° C. under $N_2$ for six hours. The mixture was filtered and washed with water to obtain a catalyst Pd/Bi/C with molar ratio of Pd:Bi of 6:1.

EXAMPLE 3

General procedure for the oxidation of lactose with Pd/Bi/C

Lactose (300 g, 0.83 mole) was dissolved in $H_2O$ (700 g) at 50° C. under $N_2$. 100 g of Pd/Bi/C catalyst was added with sufficient stirring. $N_2$ source was removed and $O_2$ was introduced into the mixture. The pH of the solution mixture was kept at 8.5 by addition of 10% aqueous NaOH with a Medler DL 70 autotitrator. The reaction was stopped when 0.83 mole of NaOH was consumed. The reaction solution was filtered under $N_2$. The filtrate was spray dried at 140° C. to obtained Na lactobionate.

EXAMPLE 4

The oxidation of lactose with Pd/Bi/C were summarized in the following table:

| Lactose (g) | Catalyst (g) | Pd/Bi ratio | Selectivity % | Reaction Time hrs. |
| --- | --- | --- | --- | --- |
| 300 | 100 | 6:5 | <70 | 26 |
| 300 | 100 | 6:2 | 97 | 5.8 |
| 300 | 100 | 6:1 | 98.2 | 5.7 |
| 300 | 100 | 6:1 | 99.0 | 5.2 |
| 300 | 100 | 6:1 | 98.4 | 7.5 |

As seen from Example 4, the Pd/Bi/C catalyst prepared by this new method (Example 2) gave high degree of selectivity (high yield) and high rate of oxidation (reaction time). The optimum molar ratio of Pd:Bi was between 6:1 to 6:2.

EXAMPLE 5

Comparative Oxidation of Lactose using 5% Pd/C with in situ bismuth promoted catalyst. The results were summarized in the following table:

| Lactose (g) | Catalyst (g) | Pd/Bi ratio | Selectivity % | Reaction Time hrs. |
| --- | --- | --- | --- | --- |
| 300 | 100[1] | 6:3 | 88 | 42 |
| 300 | 100[1] | 6:1 | 90 | 48 |
| 300 | 100[2] | 6:1 | 98.2 | 5.6 |

[1]5% Pd/C, $Bi(NO_3)_3$ was added in situ (as per Henricus reference).
[2]Catalyst prepared by the present invention (Example 2).

As the above examples show, using the catalyst prepared by the present invention, a higher degree of selectivity and higher rate of oxidation was obtained.

EXAMPLE 6

| Lactose (g) | Catalyst (g) | Pd/Bi ratio | Selectivity % | Reaction Time hrs. |
| --- | --- | --- | --- | --- |
| 300 | 100[1] | 6:1 | 96.1 | 26 |
| 300 | 100[1*] | 6:1 | 90 | 48 |
| 300 | 100[1*] | 6:1 | 89 | 54 |
| 300 | 100[2] | 6:1 | 98.2 | 5.7 |
| 300 | 100[2*] | 6:1 | 99.0 | 5.2 |
| 300 | 100[2*] | 6:1 | 98.4 | 7.5 |

[1]5% Pd/C, $Bi(NO_3)_3$ was added in situ.
[1*]Catalyst was reused from the previous experiment.
[2]Catalyst prepared by the present invention.
[2*]Catalyst was reused from the previous experiment. Addition of 0.5 ml 37% formaldehyde during the oxidation process.

As the data above indicated, addition of formaldehyde during the oxidation process slowed the deactivation process and thus increased the catalyst's stability As discussed in the specification, the use of aldehyde increases the stability of catalyst over multiple uses (i.e., catalyst remains affective over multiple uses). The oxidation reaction utilizing the improved catalyst does not, however, require use of aldehyde (as seen from fourth row, footnote 2, above).

EXAMPLE 7

Using the catalysts prepared by the present invention in the oxidation of lactose to Na lactobionate, the color of the reaction solution was measured by UV at 460 nm. The result is summarized in the following table:

| Wavelength (460 nm)* | Pd:Bi (molar ratio) |
|---|---|
| 0.2716 | 6:5 |
| 0.0766 | 6:3 |
| 0.0053 | 6:1 |
| 0.1657 | 6:0 |

*The higher distance (wavelength) equals more color, i.e., less purity.

As the above example indicated the molar ratio of Pd to Bi=6:1 gave lowest color content from the oxidation which indicated highest purity of the reaction product (Na lactobionate).

I claim:

1. A process for preparing a catalyst consisting essentially of palladium and bismuth on a carbon support which process comprises:

(1) suspending about 1 to 10% by wt. palladium (on a carbon support) and 0.1 to 10% by wt. bismuth in water, the ratio of palladium to bismuth being 6:1 to 6:2; and (2) adding 5 to 15% (by wt. of the catalyst support on carbon) of an aldehyde.

2. A process according to claim 1, wherein said palladium and said bismuth are suspended at about 20° C.–80° C.

3. A process according to claim 1, wherein palladium and said bismuth are suspended for about 2 to 8 hours.

4. A process according to claim 1, wherein the source of said bismuth is $Bi(NO_3)_3$.

5. A process according to claim 1, wherein the aldehyde is formaldehyde.

6. A process according to claim 1, wherein said aldehyde is added at 40° to 100° C.

7. A process according to claim 1, wherein said aldehyde is added for about 4 to 10 hours.

* * * * *